Jan. 15, 1935.  A. B. MUNSON  1,987,943
LICENSE PLATE HOLDER
Filed Jan. 19, 1934
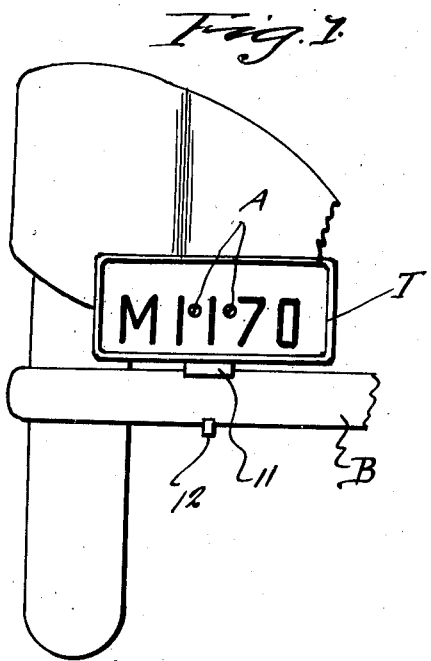
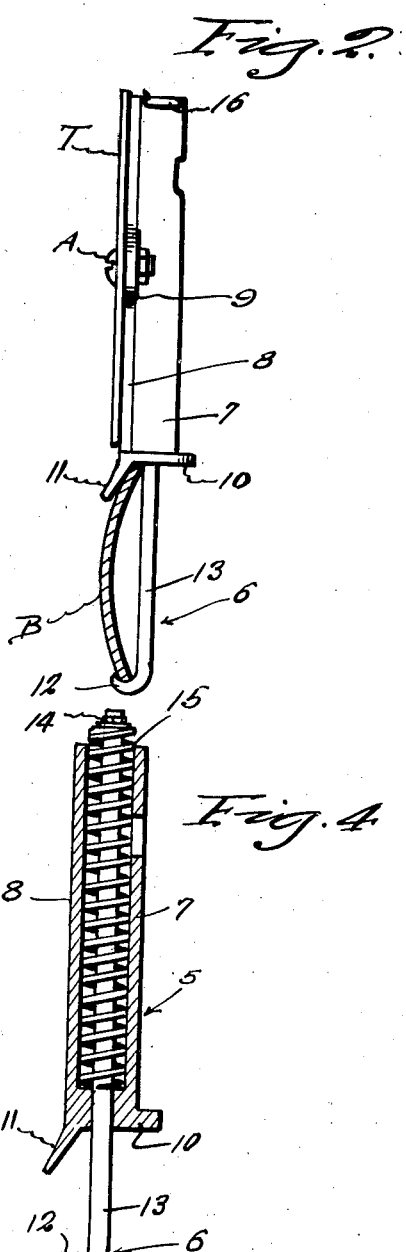
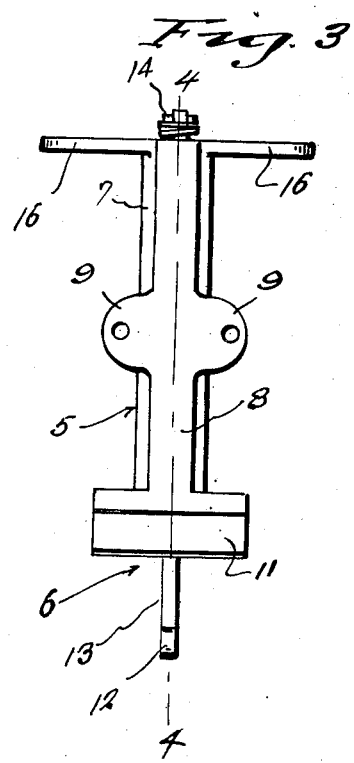
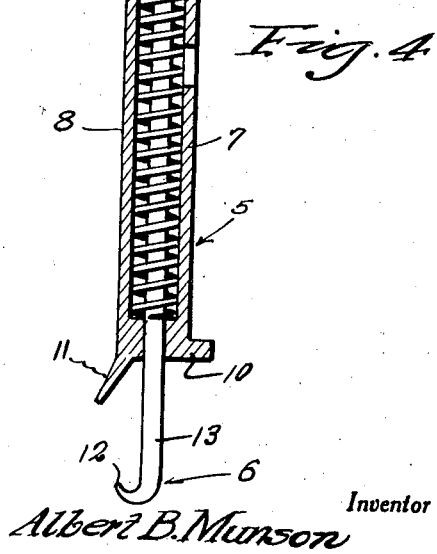
Albert B. Munson, Inventor
By Clarence A. O'Brien, Attorney Patented Jan. 15, 1935

1,987,943

UNITED STATES PATENT OFFICE 1,987,943

LICENSE PLATE HOLDER

Albert B. Munson, Warsaw, Ind., assignor to William S. Rogers, Warsaw, Ind.

Application January 19, 1934, Serial No. 707,353

8 Claims. (Cl. 40—125)

This invention relates to that class of automotive accessories and appliances comprehensively referred to as license plate and tag holders, the present invention being in the nature of an adjustable attachment for automobile bumpers.

Briefly stated the preferred embodiment of the invention comprises a standard constructed for detachable connection and support of the tag, wherein said standard is associated with a spring retained hook, the hook and lower end of the standard being fashioned to provide an adjustable clamp susceptible of dependable attachment to and maintenance upon the bumper.

In carrying the principles of the invention into actual practice I have evolved and produced a useful and economical device of a splendid type such as may be justly endorsed and sponsored by the trade as an adequate and safe means of securing a license tag in an erect visible position on the bumper.

The particular structure features such as provided for durability and permanence will become more readily apparent from the following description and drawing.

In the drawing:

Figure 1 is an elevational view showing a fragmentary portion of a conventional automobile bumper with the license plate or tag and holder applied for use.

Figure 2 is an edge elevational view of Figure 1 observing it in the direction from right to left, the view being enlarged to portray the details and association of parts.

Figure 3 is an elevational view of the holder per se, that is with the tag or plate removed.

Figure 4 is a central vertical sectional view taken approximately on the plane of the line 4—4 of Figure 3.

In the drawing in Figures 1 and 2 the bumper is denoted by the letter B and the tag or plate by the letter T. The plate is attachable to the holder by way of bolts or equivalent fasteners A.

As shown in Figure 3 the holder is made up of two principal companion parts, the main or upper part is designated as a standard and denoted by the numeral 5. The clamping hook is distinguished, as a unit, by the numeral 6. As shown in Figure 4 the standard embodies a perpendicular socket 7 whose frontal portion is flattened as indicated at 8 to form what may be designated as a backing and retention face for the tag. This preferably corresponds in height with the width of the tag so as to form an effective and uniform backing for the tag. It is formed intermediate its ends with a pair of outstanding apertured attaching ears 9 to which the tag is bolted as shown in Figure 2. The lower portion of the standard or socket is fashioned as indicated at 10 to designate a base. This is in effect a clamping element and rests upon the upper edge of the bumper as shown in Figure 2. It is provided with a depending outbent lip 11 which engages down over the bumper and serves as a retaining and stabilizing member. Cooperating with the lip is the bill 12 of the hook 6. The shank or stem 13 of the hook extends slidably up through the socket and is provided at its top with a washer held in place by a key or pin 14 as shown in Figure 3. This serves to hold the coil spring 15 properly assembled. The spring surrounds the stem of the bolt and is located in the socket. Thus in a sense we have a spring pressed hook cooperating with a socket type standard adjustably and detachably connectible with the bumper. When in position as shown in Figures 1 and 2 it provides an effective holder for the license tag. It is to be noted that the upper end of the standard or socket is formed with a pair of outstanding arms 16 which function as finger grips and in placing the device in position the hook 12 is engaged beneath the lower edge of the bumper and the finger grip 16 grasped and the entire unit or standard 5 is lifted against the tension of the spring and the base portion 10 and 11 is engaged over the upper edge portion of the bumper. This facilitates application and removal of the holder. The tag may be attached before or after the connection of the holder with the bumper.

The features that I desire to emphasize as of distinctive importance are these: First, the combination of the spring pressed retaining hook with the companion standard 5 wherein the standard is fashioned with features 10 and 11 to cooperate with the hook is believed to be ingenious. Secondly, the idea of providing the standard with the finger grips 16 so as to permit it to be bodily lifted against the tension of the spring and to allow the hook and parts 10 and 11 to be properly anchored is an innovation. Specifically the construction of the standard 5 including a socket 7 to accommodate the spring pressed shank of the hook and the flat faced portion 8 forming a backing for the tag and the attaching ears 9 and 10 is an appreciable refinement. All of these parts provide, through their coordinated coaction the features of simplicity and dependability relied upon to support the contention that the device constitutes a splendid and reliable tag holder, especially in view of the fact that it is applicable to a bumper in a convenient and satisfactory manner.

A careful consideration of the foregoing description in conjunction with the illustrative drawing will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

1. A tag holder comprising a standard formed at its lower end with a flat supporting base and stabilizing lip depending laterally from said base, and means for holding the standard securely in place, said standard being provided with a flat faced frontal portion constituting a backing element and said flat faced portion including a pair of outstanding apertured attaching ears to which the tag is detachably connectible.

2. A tag holder comprising a member having a socket adapted for perpendicular disposition, means for seating the lower end of the socket member firmly on a support, a hook including a stem slidably mounted in said socket, a coil spring surrounding the stem and located in the socket to hold the hook and socket member in relatively adjusted retaining position, and means for detachably connecting the tag to said socket member.

3. A tag holder comprising a member having a socket closed at its bottom and open at its top, the outer face of said socket member being flattened to provide a backing member and said backing member being provided with apertured attaching ears, the upper end portion of the socket member being provided with outstanding integral finger gripping members, and means extending through said socket and beyond the bottom of the socket member whereby said means is adapted to cooperate with said bottom to detachably connect the socket member to an external object.

4. A tag holder comprising a socket member closed at its bottom and open at its top, said bottom being formed with a flat base and an outwardly and laterally directed stabilizing lip, the outer face of said socket member being flattened to provide a backing member and said backing member being provided with apertured attaching ears, the upper end portion of the socket member being provided with outstanding integral finger gripping members, an attaching hook embodying a stem slidably mounted in said socket and a coil spring surrounding the stem and located in the socket to hold the hook yieldably engaged with the part to which it is attached.

5. A tag holder comprising a standard formed at its lower end with a flat supporting base, a stabilizing lip depending laterally from said base, a spring pressed hook extending from said standard, and having its terminal in direct alinement with the stabilizing lip, and means on said standard for detachably connecting a tag thereto.

6. A tag holder comprising a standard formed at its lower end with a flat supporting base of substantially the same diameter as the diameter of the standard, a stabilizing lip issuing from said base, a hook attached to said standard and vertically adjustable relative to said base for holding the standard securely in place, and a backing element integrally formed with the standard to provide attaching means for the tag.

7. A tag holder comprising a standard constructed to support a tag, said standard having a flat base and adapted to occupy a perpendicular position on a support, and having a backing element with a pair of outstanding ears to detachably secure the tag to the standard, said base being substantially of the same diameter as the diameter of the standard, and a retaining hook connected with said standard and vertically adjustable relative to the base.

8. A tag holder comprising a standard having its lower end fashioned to seat firmly on the upper edge portion of a support, and having a backing element with a pair of outstanding ears to detachably secure the tag to the standard, a retaining hook slidably connected with said standard, and a retention spring associated with the standard and hook to automatically and vertically adjust and hold the hook in adjusted position relative to the lower end of the standard.

ALBERT B. MUNSON.